March 24, 1959  M. WOLF  2,878,692
VARIABLE TRANSMISSION
Filed Jan. 19, 1954  2 Sheets-Sheet 1
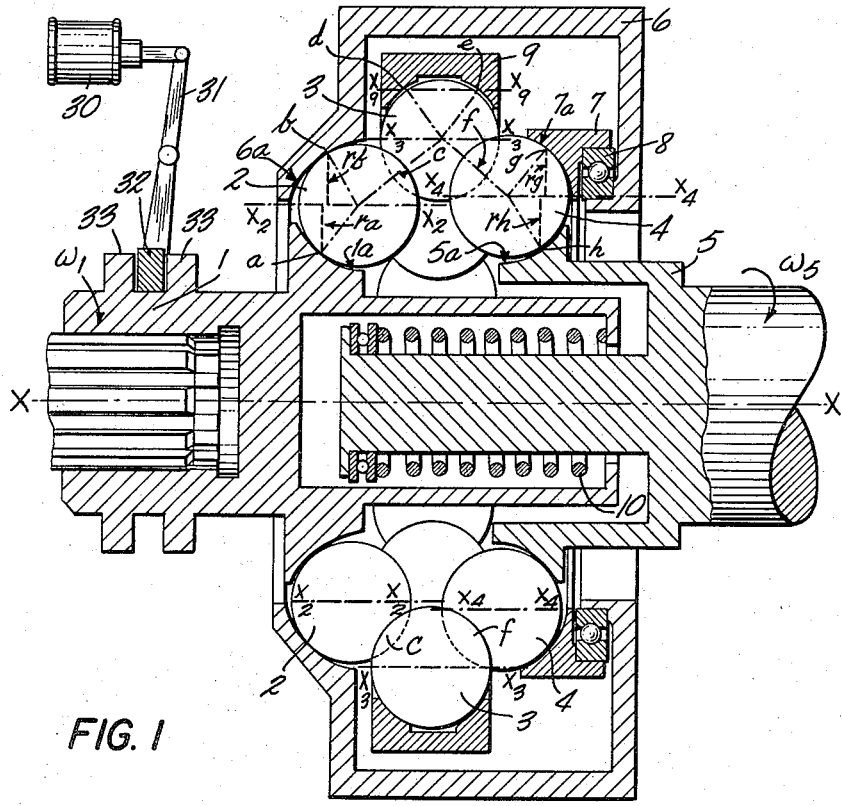
FIG. I
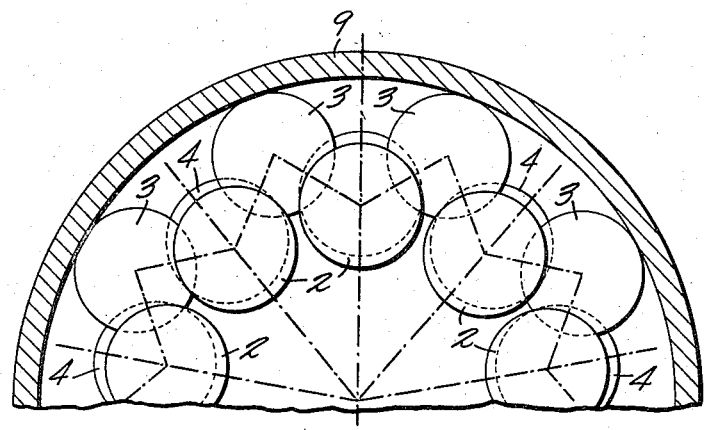
FIG. 2

United States Patent Office 2,878,692
Patented Mar. 24, 1959

2,878,692

VARIABLE TRANSMISSION

Maurizio Wolf, Turin, Italy, assignor to Fiat Società per Azioni, Turin, Italy

Application January 19, 1954, Serial No. 404,990

11 Claims. (Cl. 74—796)

This invention relates to a gearing comprising mainly three rows of balls which are pressed against one another and roll on annular rolling tracks of suitable shape incorporated by the transmission or guide members. According to the axial position of the rows of balls with respect to a main rolling track fast with the frame of the gear drive, the balls transmit a rotary motion between the primary and secondary transmission members with a variable ratio proportional to the said axial position in accordance with a law determined by the shape of the rolling tracks.

The necessary pressure between the balls for transmitting movement without sliding can be obtained mechanically by spring means of suitable stiffness such as springs, yielding rings or discs or the like even of an electromagnetic character, or hydraulically or pneumatically. The axial displacement of a ball set with the respective rolling track can be effected by mechanical, hydraulic, electromagnetic or pneumatic means.

The accompanying drawing shows diagrammatically by way of example only some embodiments of this invention.

Figure 1 is an axial sectional view of a gearing according to this invention,

Figure 2 is a detail view of Figure 1,

Figure 3:
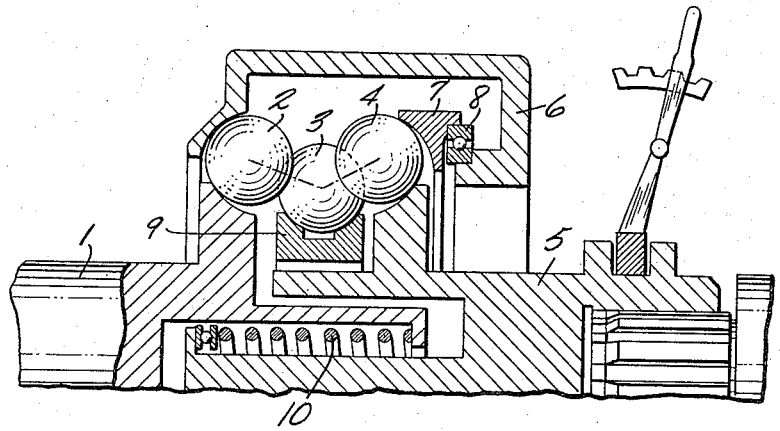
Figure 3 shows a modification of Figure 1.

In Figures 1 and 2, 1 is the driving shaft which transmits motion to the shaft 5 through balls 2, balls 3 and balls 4.

The balls 2 contact at the points $a$, $b$ the rolling track $1a$ on the shaft 1 and the rolling track $6a$ in the frame 6, said frame 6 being the reaction member. The points of contact between the balls 2 and 3 are the points $c$. The contact points between the balls 3 and 4 are the points $f$; the contact points between the balls 4 and rolling track $7a$ in the ring 7 are the points $g$, and the points of contact between the balls 4 and rolling track $5a$ on the shaft 5 are points $h$.

The ring 7 is supported by the reaction member 6 through a bearing 8 and is freely rotatable but for the action of the balls 4.

The balls 3 are held and guided in the outer guide ring 9. The spring 10 is adapted to press the members 1 and 5 against the balls 2 and 4 which in turn press the balls 3 held and guided by the ring 9. The members 1 and 5, and hence the tracks carried by them are axially displaceable by a unit 30 operatively connected by linkage 31 to a collar 32 engaging between shoulders 33 on the shaft 1 so as to move the shaft axially while permitting its rotation. The unit 30 may be a hydraulic or pneumatic cylinder or a solenoid, as desired. The ring 9 acts on the balls 3 in such manner as to permit the said balls 3 to roll with respect to an axis $X_9$—$X_9$ only extending through the points of contact $d$, $e$, that is, to perform a relative rotation of their own with respect to their axis $X_3$—$X_3$ perfectly parallel with the axis of symmetry X—X of the whole gearing. On account of the symmetrical angular ball arrangement and by virtue of the rotational axis $X_3$—$X_3$ the balls 2 and 4 are rotated with respect to axes parallel with the main axis X—X, more particularly, the balls 2 and 4 rotate with respect to the axis $X_2$—$X_2$ and axis $X_4$—$X_4$, respectively. Consequently, no gyroscopic couple of forces acts thereon.

Instead of retaining the balls 3 from the outside, the ring 9 can be arranged to retain a row of balls $3a$ from the inside, as shown in Figure 3.

The transmission ratio between the shaft 1 and shaft 5, either of which may be primary and secondary shaft, respectively, depends upon the axial position of the members 1—2—3—4—5 with respect to the member 6 or vice versa, since variation of the relative position between the said parts results first of all in variation in spacing from the axis X—X of the points of contact $a$, $b$, $g$ and $h$ affecting the respective rolling radii $r_a$, $r_b$, $r_g$ and $r_h$ of the balls 2 and 4 with respect to their axis. Denoting by $\omega_1$ the angular speed of the shaft 1 acting as primary shaft, and by $\omega_5$ of the shaft 5 acting as secondary shaft, the transmission ratio $$i = \frac{\omega_5}{\omega_1}$$

will obviously be a function of the spacing of points $a$, $b$, $g$ and $h$ from the axis X as well as of the magnitudes of the radii $r_a$, $r_b$, $r_h$ and $r_g$. The ratio $$i = \frac{\omega_5}{\omega_1} = 1$$

applies to one, and one only intermediate axial position.

The above described arrangement may be compared with a planetary gearing (or differential system) in which the fixed ratios given by the spur or bevel gears are replaced by an arrangement affording a variable ratio.

The result is that, similarly to the planetary or differential gears, this gearing can be used in widely different manners, whereby any possibility and effect obtainable from the said planetary gears can be met with the added improvements afforded by novel possibilities deriving from variability in the ratio $$i = \frac{\omega_5}{\omega_1}$$

which is termed the (variable) "inner ratio" of the rolling gear.

Instead of introducing movement from the shaft 1 (or 5), the movement may be introduced for instance from the reaction member 6 (frame). In this case, the parts being arranged in a fully symmetrical position, the member 6 rotating and the member 5 being stationary by way of example, the member 1 will likewise be stationary. Axial displacement to the left or right with respect to the member 6 of the members 1—2—3—4—5 sets the shaft 1 in rotation in either direction, respectively.

Figure 4:
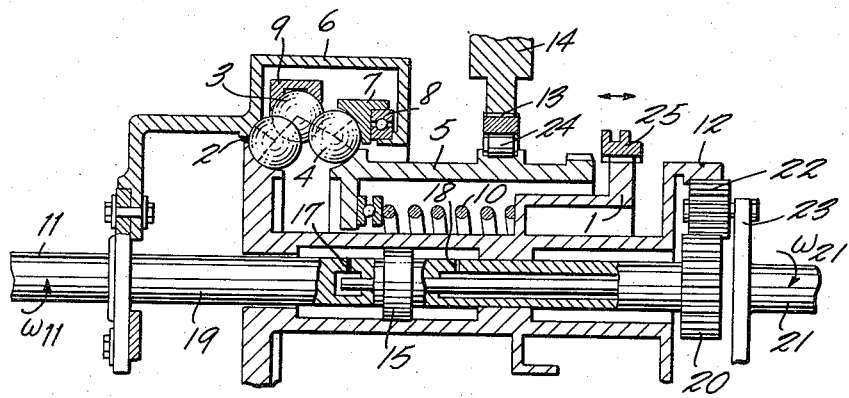
Figure 4 shows the gearing in connection with a change speed gear for motor vehicles.

The change speed gear shown in Figure 4 is based on this principle. In the said figure, 11 denotes the engine shaft with a flywheel 6. The shaft 1 and rolling track $1a$ is fast with the toothed rim of an auxiliary planetary gearing comprising the toothed wheels 20—22 and planet wheel carrier 23.

The shaft 5 can be kept against rotation in the direction of reaction by a free wheel 24, or in both directions by a set of teeth 13 meshing with a clutch on the bed plate 14.

Figure 5:
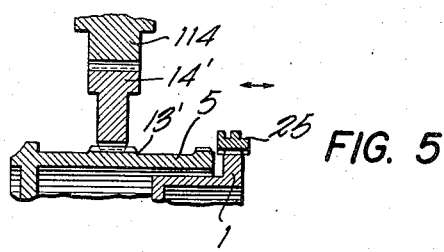
Fig. 5 shows a modified detail of the gearing according to Fig. 4.

The shaft 5 can be further prevented from rotating in both directions. Fig. 5 clearly shows how this can be effected. The free wheel 24 may be dispensed with. The shaft 5 is provided with a set of teeth 13' meshing with a clutch on the movable plate 14' which may slide coaxially with respect to the member 5 and the stationary bed plate 114. Means (not shown) are also provided for displacing the movable plate 14' together with a coupling referred to hereinafter, in order to bring the plate 14' out of engagement with the shaft 5 when the latter engages the member 25.

The relative axial displacements of the members 1—2—3—4—5 with respect to member 6 in order to vary the inner transmission ratio $$i = \frac{\omega_5}{\omega_1}$$

hence the outer ratio $$R = \frac{\omega_{21}}{\omega_{11}}$$

is effected by the following hydraulic unit. A plunger 15 is movable in a cylinder 16 which receives the driving liquid through holes 17 or 18. The liquid delivery is controlled by means of a slide valve, not shown on the drawing, which may be operated (1) By hand
(2) Automatically, for instance as a function of the torque transmitted by the gear
(3) Automatically and by hand (in order to meet various operational requirements).

The shaft 19 is secured at one end to the flywheel 6 and engine shaft 11, and carries at its other end a toothed wheel 20 of the auxiliary sun and planet gear provided for operating the secondary or output shaft 21. In the fully symmetrical position of the parts 1—2—3—4—5 with respect to the member 6, the shaft 1 and crown wheel 12 are stationary. Since the shaft 19 together with the toothed wheel 20 rotates at the angular speed $\omega_{11}$ of the engine, the outer ratio between the output shaft 21 and engine shaft 11 is given by the ratio $R_0$ resulting from the sun and planet gear 12—20—22—23, the crown wheel 12 being stationary. On axial displacement of the members 1—2—3—4—5 with respect to the member 6 in either direction, the shaft 1 together with the crown wheel 12 starts rotating in either direction at a speed proportional to the said displacement. Consequently, the planet wheel carrier 23 which is fast with the output shaft 21 is rotated with a corresponding variation in ratio. The outer ratio $$R = \frac{\omega_{21}}{\omega_{11}}$$

obviously depends both on the inner ratio $i$ and on the outer ratio $R_0$ of the sun and planet gear.

A coupling 25 is provided for direct drive, which locks the members 1 and 5 together, at the same time disconnecting the member 5 from the bed plate 14 by means of a connection not shown on the drawing, whereupon the unit is freely rotatable without any limitation from the outside.

What I claim is:
1. In a variable speed transmission, a driving member, a driven member, and a reaction member, relatively rotatable about a common axis, a first, second and third circular row of balls in frictional contact with one another, five annular rolling tracks coaxial with said common axis for the balls of said rows of balls, said first and third row of balls being lateral rows of balls, said second row of balls being an intermediate row of balls, at least two of said rolling tracks being external tracks and at least two of said rolling tracks being internal tracks, the balls of said lateral rows rolling each on an internal track and an external track, the balls of said intermediate row of balls being arranged between the fifth rolling track and the balls of said lateral rows of balls, said two external and two internal rolling tracks contacting with the balls of said lateral rows at the sides of said balls opposite the balls of said intermediate row, said two internal rolling tracks being axially movable with respect to one another, a spring for urging said two internal tracks toward one another, means for displacing said internal tracks with respect to one another against the action of said spring, an annular outer casing surrounding said rows of balls for supporting said two outer rolling tracks, one of the latter being fast with said casing and the other being rotatably mounted therein, one of said rolling tracks being drivingly connected with said driving member, one with said reaction member and one with said driven member.

2. A variable speed transmission as set forth in claim 1, wherein the driven and driving members are in the form of shafts each fast with one of said two internal rolling tracks and wherein said annular outer casing acts as a reaction member.

3. A variable speed transmission as set forth in claim 1, wherein the reaction member is stationary.

4. A variable speed transmission as set forth in claim 1, wherein said outer annular casing is the driving member and said driven and reaction members are in the form of coaxial shafts.

5. A variable speed transmission as set forth in claim 1, wherein said driven and driving members are in the form of coaxial shafts, said annular outer casing being fast with said driving shaft, the internal rolling track for the balls of one lateral row of balls facing the external rolling track fast with said annular outer casing being drivingly connected with said driven shaft, the other inner rolling track being fast with the reaction member, the latter being held against rotation in at least one direction.

6. A variable speed transmission as set forth in claim 1, wherein the axial displacement of the said two internal rolling tracks is effected by means of a pressure fluid.

7. A variable speed transmission as set forth in claim 1, wherein the axial displacement of the said two internal rolling tracks is effected by means of an electromagnet.

8. A variable speed transmission as set forth in claim 1, wherein said driving and driven members are in the form of coaxial shafts connected therebetween by means of a transmission, comprising a sun gear carried by said driving shaft, a planet gear meshing the latter and rotatably supported on a carrier fast with the driven shaft, and a crown wheel fast with a first hollow shaft surrounding said driving shaft, the internal rolling track for the balls of one lateral row of balls facing the external rolling track fast with said annular outer casing being fast with said first hollow shaft, the other inner rolling track being fast with a second hollow shaft surrounding the first hollow shaft, the latter being held against rotation in at least one direction, means being provided for securing said first and said second hollow shafts.

9. A variable speed transmission according to claim 1, wherein said two internal rolling tracks are fast respectively on two axial shafts, and wherein said spring acts between said shafts to urge said two internal tracks toward one another.

10. A variable speed transmission as claimed in claim 1, in which the reaction member is incorporated with a sun and planet gear.

11. A variable speed transmission as claimed in claim 1, in which the axial displacement of the rows of balls with the respective rolling tracks is effected by means of a pressure fluid.

References Cited in the file of this patent
UNITED STATES PATENTS

| | | |
|---|---|---|
| 2,100,629 | Chilton | Nov. 30, 1937 |
| 2,535,453 | Rabl | Dec. 26, 1950 |
| 2,586,725 | Schottler | Feb. 19, 1952 |

FOREIGN PATENTS

| | | |
|---|---|---|
| 739,917 | Great Britain | Nov. 2, 1955 |